United States Patent [19]

Truhan et al.

[11] 4,260,401
[45] Apr. 7, 1981

[54] REGENERATIVE CYCLONE-TYPE AIR/PARTICULATE CONCENTRATOR AND COLLECTOR

[76] Inventors: Andrew Truhan, P.O. Box 467, Granite Falls, N.C. 28630; William R. Haynes, Rte. 1, Box 127, Taylorsville, N.C. 28681

[21] Appl. No.: 130,472

[22] Filed: Mar. 14, 1980

Related U.S. Application Data

[63] Continuation-in-part of Ser. No. 96,488, Nov. 21, 1979.

[51] Int. Cl.³ ............................................. B01D 45/12
[52] U.S. Cl. ..................................... 55/339; 55/414; 55/459 B; 55/459 D; 55/463
[58] Field of Search ................. 55/449, 459 R, 459 A, 55/459 B, 459 C, 459 D, 442, 443, 414, 413, 415, DIG. 37, 339, 338, 463

[56] References Cited

U.S. PATENT DOCUMENTS

| | | |
|---|---|---|
| 1,344,146 | 6/1920 | Peck . |
| 1,408,693 | 3/1922 | Deily . |
| 2,074,818 | 3/1937 | Watson . |
| 2,153,270 | 4/1939 | Osgood ................................. 55/339 |
| 2,222,930 | 11/1940 | Arnold ................................. 55/339 |
| 2,583,696 | 1/1952 | Held et al. . |
| 3,800,429 | 4/1974 | Lindl ................................... 55/415 |

*Primary Examiner*—Bernard Nozick
*Attorney, Agent, or Firm*—Kerkam, Stowell, Kondracki & Clarke

[57] ABSTRACT

A cyclone-type particulate collector and concentrator is provided wherein the outlet tube is provided with a conical concentrator having its sidewalls formed of a plurality of tapered, spaced, nested, generally U-shaped and cross-section vaned members between which the gas entering the outlet tube must pass in flowing to the outlet end of the outlet tube. A portion of the sidewall of the outlet tube of the cyclone-type particulate collector is provided with a gate to act as a particulate skimmer which opens into the gas inlet volute for recirculation of the skimmed particles.

3 Claims, 4 Drawing Figures

FIG. 1.
FIG. 3.
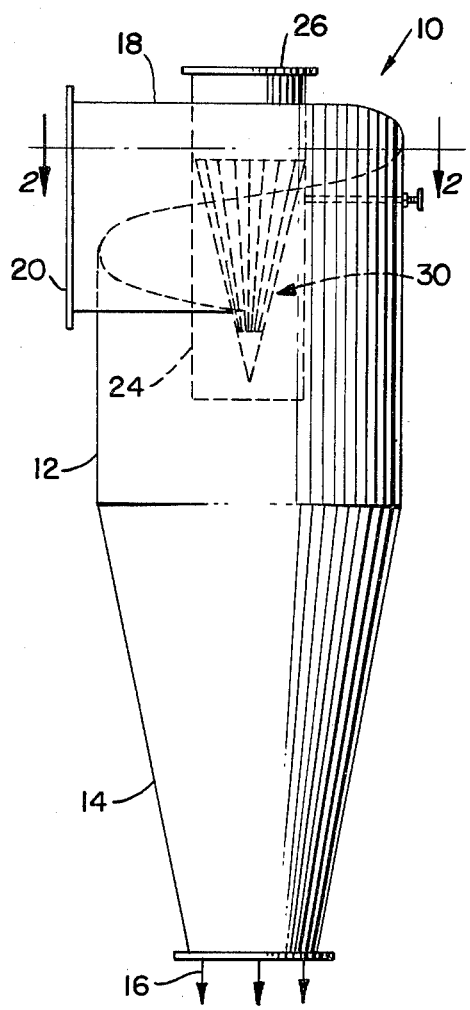
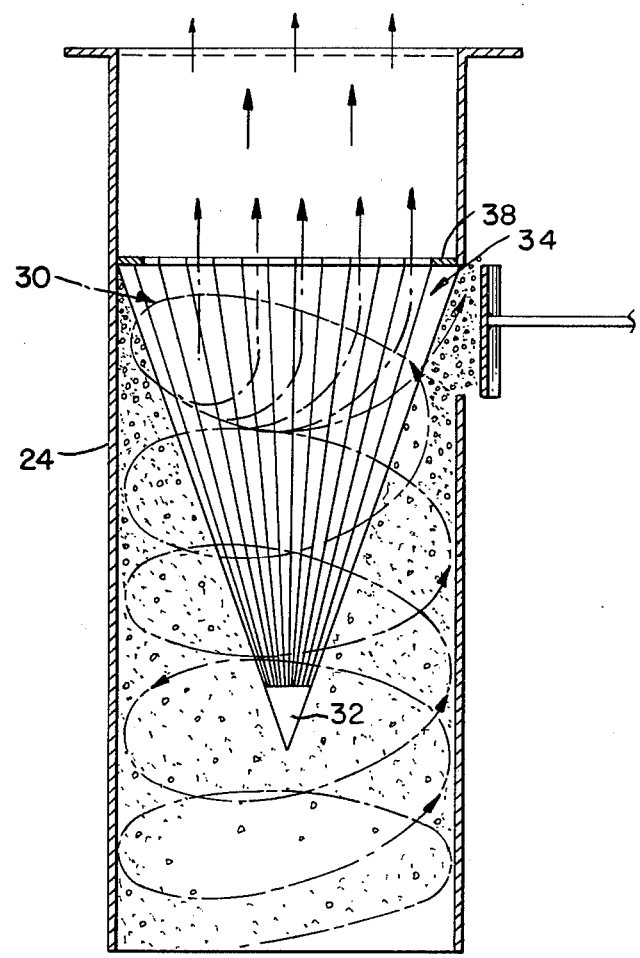

REGENERATIVE CYCLONE-TYPE AIR/PARTICULATE CONCENTRATOR AND COLLECTOR

CROSS-REFERENCE TO RELATED APPLICATION

This application is a Continuation-In-Part of our Application Ser. No. 96,488 filed Nov. 21, 1979.

TECHNICAL FIELD

This invention relates to a cyclone-type air or gas cleaner and particulate concentrator having an internal, vaned inertial concentrator and a particle skimmer means to improve the particle collecting efficiency without materially increasing pressure drop over less efficient collectors of the prior art.

BACKGROUND OF PRIOR ART

Cyclone-type collectors are well known in the art, including types having particle skimming means, and inlet scrolls or volutes. Further, it is known to provide cyclone-type collectors with means in the clean gas outlet tube to improve the particle collecting efficiency of the collector. Exemplary of such prior art are U.S. Patents:
U.S. Pat. No. 1,344,146-Peck
U.S. Pat. No. 1,408,693-Deily
U.S. Pat. No. 2,074,818- Watson
U.S. Pat. No. 2,583,696-Held et al.

BRIEF SUMMARY OF INVENTION

The present invention may be summarized as a cyclone-type particulate collector and concentrator having a cylindrical body portion with a conical lower particulate material outlet tube. Dirty gas enters the collector through an inlet volute at the upper end of the cylindrical body portion through which a cylindrical gas outlet tube projects and terminates in the cylindrical body portion. Mounted within the cylindrical outlet tube is a conical concentrator having the apex of the cone directed toward the gas inlet of the outlet tube. The sidewall of the cone, except at the apex, is formed of a plurality of tapered, spaced, nested, generally U-shaped in cross-section vane members between which the gas entering the outlet tube must pass. Adjacent the upper end of the conical concentrator is mounted a particulate skimmer which opens into the gas inlet volute for recirculation of the skimmed particles through the body portion of the cyclone-type collector.

The collector of the invention may also include an adjustable means for the passage between the gas outlet tube and the dirty gas inlet volute.

BRIEF DESCRIPTION OF THE DRAWINGS

The invention will be more particularly described in reference to the accompanying drawings wherein:

FIG. 1 is a vertical sectional view of one form of the cyclone-type particle concentrator and collector of the invention;

FIG. 3 is a section on line 3—3 of FIG. 1; and

DETAILED DESCRIPTION OF INVENTION

Figure 2:
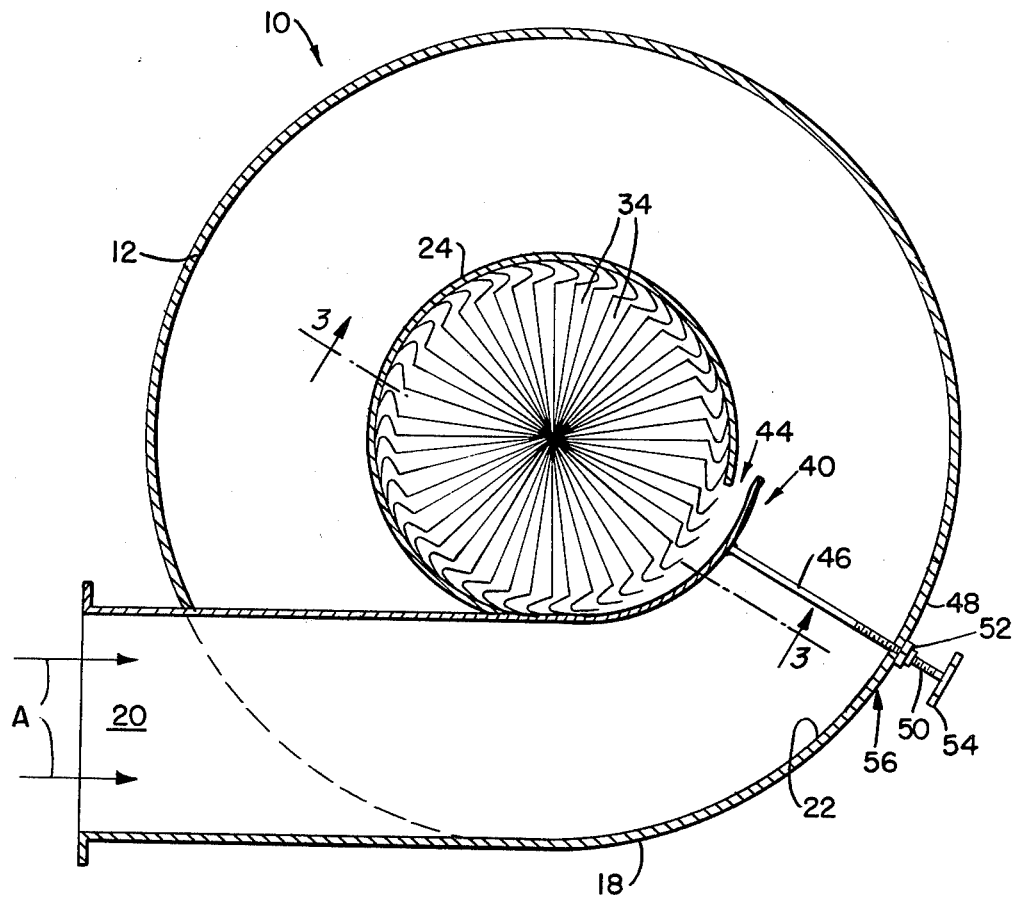
FIG. 2 is a section on line 2—2 of FIG. 1.

Referring to the drawings, 10 generally designates one embodiment of the improved cyclone-type particle concentrator and collector.

The collector 10 includes a cylindrical body portion 12 having a conical particulate material outlet portion 14 depending therefrom. The discharge from the lower end of the cone, as at 16, may be connected to suitable particulate material collection hoppers and the like as is well known in the art The upper end 18 of the cylindrical housing 12 is in the form of a helix, scroll or volute to provide a zone within which the dirty air entering the inlet 20 of the volute 22, as illustrated by directional arrow A, obtains its initial swirling action. Extending through the helical top 22 is a cyclone vortex outlet tube 24 of generally cylindrical configuration. The upper end 26 of the vortex outlet tube 24 is the clean air outlet and is connected via suitable ducting, not shown, to the atmosphere or, to further treatment.

Figure 4:
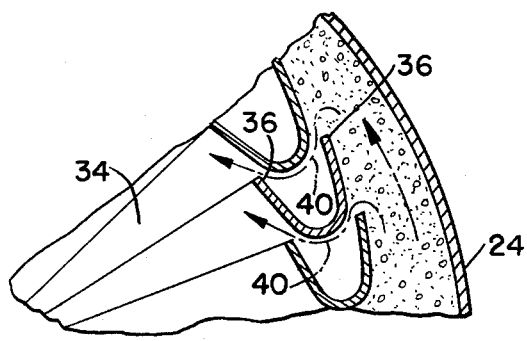
FIG. 4 is an enlarged somewhat diagrammatic view of a portion of the vaned concentrator of the invention.

The structures hereinabove described are the structures which are common to conventional cyclone-type collectors. In order to improve the collecting efficiency of the apparatus, and in order to remove small particulates which would normally issue from the exit 26 of the outlet tube 24, there is provided a unique conical concentrator generally designated 30. The conical concentrator 30 has its apex end 32 directed downstream and the height of the cone 30 is less than the length of the outlet tube 24. Other than for the small apex tip end of the conical concentrator 30, its sidewalls are formed of tapered, spaced, nested generally U-shaped in cross-section vane members 34. The U configuration of the vane members 34 are best depicted in FIGS. 2 and 4 of the drawing. The diameter of the cone 30 is such that at its upper end the outer legs forming the U-shaped vanes 34 contact the inner wall of the outlet tube 24, and the upper ends of the vanes are in contact with a ring 38 secured to the inner wall of the outlet tube 24 as more clearly shown in FIG. 3 of the drawing.

Referring more particularly to FIGS. 2 and 4, the legs 36 of the vanes 34 are of a length such that there is a slight overlap between adjacent vanes 34 and thereby provide a passage as depicted by directional arrow 40, FIG. 4, for the flow of the gas spiralling upwardly in the outlet tube 24. The tortuous course of the gas stream passing from the outlet tube 24 through the spaces between adjacent vanes causes the particulate carried in the gas stream to move toward the inner wall of the outlet tube 24 and to be concentrated therein. Approximately at the upper terminals of the conical concentrator there is provided a skimmer generally designated 42. The skimmer comprises a portion of the wall of the outlet tube severed along three edges and providing an outlet passage generally designated 44 for the concentrated particulates. The width of the opening of the outlet passage 44 may be varied by a control member 46 passing through the inlet air passage to the external wall 48 of the cylindrical housing 12 and provided with threads 50 which mate with a threaded element 52 welded to the wall 48. In order to render adjustment of the skimmer outlet more convenient a hand-knob 54 is secured to the extended end of the shaft 46 which hand-knob may include indicia cooperating with a marker 56 carried by the outer wall 48 of the cylindrical housing of the collector.

The amount of opening provided for the skimmer is determined by various factors such as the size and loading of the particulates in the gas stream being treated and the requirements of the outlet gas issuing from the collector.

By way of example, if the collector is sized to properly handle 3,000 cfm of gas and with the skimmer functioning efficiently and effectively, air flow to the inlet 20 may be about 2500 cfm, and the additional 500 cfm being re-injected into the inlet gas by the skimmer.

In general, it will be recognized by those skilled in the art that as little as 10% to as much as 50% of the air flow capacity of the air particulate concentrator and collector may be recirculated air from the skimmer.

For a concentrator collector size to handle a total input air volume of 2500 cfm for particulate of density 43 lb/ft$^3$ and air temperature 70° F., the following dimensions have been found to be satisfactory:

1. diameter of the cylindrical body portion 12 is 36 inches;
2. overall height of the cylindrical body portion including the conical outlet tube is 66 inches;
3. diameter of outlet tube 24 is 16 inches;
4. height of outlet tube 24 is 42 inches;
5. height of the conical concentrator 30 is 16 inches;
6. length of the legs of the U-shaped concentrator vanes at their upper ends is 3¾ inches;
7. height of the adjustable gate or door 46 is 24 inches; and
8. width of the adjustable door 40 is 1½ inches.

While the above recited dimensions have been given by way of example, it will be recognized by those skilled in the art that various modifications in said dimensions may be made without departing from the scope of the present invention.

Statement of Industrial Application

An improved cyclone-type air or gas cleaner, and particulate concentrator is provided which will clean air from a woodworking furniture factory, for example, to a degree which will meet present air pollution control regulations.

We claim:

1. A cyclone-type particulate material collector comprising:
   a generally cylindrical body portion having a conical lower particulate material outlet portion;
   a dirty gas inlet volute at the upper end of the cylindrical body portion;
   a cylindrical gas outlet tube projecting through the inlet volute and terminating in the cylindrical body portion;
   a conical particulate material concentrator mounted in the outlet tube, said conical concentrator positioned with its base downstream in respect to the direction of gas flow through the gas outlet tube, the sidewall of said conical concentrator formed of a plurality of tapered generally U-shaped vane members; and
   a skimmer in the upper wall of the gas outlet tube upstream of the base of the conical concentrator.

2. A cyclone-type particulate material collector comprising:
   a generally cylindrical body portion having a conical lower particulate material outlet portion;
   a dirty gas inlet volute at the upper end of the cylindrical body portion;
   a cylindrical gas outlet tube projecting through the inlet volute and terminating in the cylindrical body portion;
   a conical particulate material concentrator mounted in the outlet tube, said conical concentrator positioned with its base downstream in respect to the direction of gas flow through the gas outlet tube, the sidewall of said conical concentrator formed of a plurality of tapered, spaced, nested generally U-shaped in cross-section vane members between which the gas entering the gas outlet tube must pass; and
   a skimmer door in the upper wall of the gas outlet tube upstream of the base of the conical concentrator.

3. The cyclone-type particulate material collector as defined in claim 2 further including means for adjusting the skimmer door to vary the portion of gas in the outlet tube which is re-directed to the cylindrical body portion of the collector.

* * * * *